US009674337B2

(12) United States Patent
James et al.

(10) Patent No.: US 9,674,337 B2
(45) Date of Patent: Jun. 6, 2017

(54) SYSTEM AND METHOD FOR DISTRACTION MITIGATION

(71) Applicant: 2236008 Ontario, Inc., Waterloo (CA)

(72) Inventors: Alexandre James, Ottawa (CA); Mark John Rigley, Ottawa (CA); Robert Vincent, Ottawa (CA)

(73) Assignee: 2236008 Ontario Inc., Waterloo, Ontario ( * ) Notice: Subject to any disclaimer, the term of this patent is extended or adjusted under 35 U.S.C. 154(b) by 193 days.

(21) Appl. No.: 14/200,902

(22) Filed: Mar. 7, 2014

(65) Prior Publication Data
US 2015/0256669 A1    Sep. 10, 2015

(51) Int. Cl.
*H04M 1/725* (2006.01)
*H04W 4/04* (2009.01)
*H04W 48/04* (2009.01)
H04M 1/60 (2006.01)

(52) U.S. Cl.
CPC ....... *H04M 1/72577* (2013.01); *H04W 4/046* (2013.01); *H04W 48/04* (2013.01); *H04M 1/6075* (2013.01)

(58) Field of Classification Search
CPC ......... H04M 1/72569; H04M 1/72577; H04W 4/046
USPC ....................................................... 455/418
See application file for complete search history.

(56) References Cited

U.S. PATENT DOCUMENTS

| 2007/0200672 A1* | 8/2007 | McBride | B60R 25/245 340/5.72 |
| 2008/0214211 A1* | 9/2008 | Lipovski | H04M 1/72577 455/456.4 |
| 2011/0105097 A1* | 5/2011 | Tadayon | H04M 3/53 455/418 |
| 2012/0006610 A1* | 1/2012 | Wallace | H04M 1/67 180/272 |
| 2012/0071151 A1* | 3/2012 | Abramson | H04L 67/12 455/418 |
| 2012/0214515 A1* | 8/2012 | Davis | H04W 4/023 455/456.3 |
| 2012/0253552 A1* | 10/2012 | Skelton | B60K 28/063 701/2 |

(Continued)

FOREIGN PATENT DOCUMENTS

WO    WO 2013/165989 A2    11/2013
WO    WO 2013/181310 A2    12/2013

OTHER PUBLICATIONS

European Search Report for corresponding European Application No. 15157968.7 dated Oct. 30, 2015, 6 pages.

*Primary Examiner* — Qun Shen
(74) *Attorney, Agent, or Firm* — Brinks Gilson & Lione

(57) ABSTRACT

A system and method for distraction mitigation wherein a location of a mobile device within one of one or more zones in a vehicle may be determined and the behavior of the mobile device and/or in-vehicle systems, with which the mobile device interacts, may be modified based on the determined location. In one example, the location of a smartphone may be determined to be within the area (a.k.a. zone) of an automobile cabin associated with a driver of the automobile and the smartphone user interface may be locked to prevent direct operation of the smartphone by the driver while still allowing indirect operation via, for example, a Bluetooth connection to an automobile infotainment system.

24 Claims, 6 Drawing Sheets

(56) References Cited

U.S. PATENT DOCUMENTS

| | | | | |
|---|---|---|---|---|
| 2013/0165178 A1* | 6/2013 | Lee | ............... | H04M 1/00 455/550.1 |
| 2014/0113619 A1* | 4/2014 | Tibbitts | ............... | G07C 5/008 455/419 |
| 2014/0314250 A1* | 10/2014 | Park | ............... | G01S 5/18 381/92 |

* cited by examiner

SYSTEM AND METHOD FOR DISTRACTION MITIGATION

BACKGROUND

1. Technical Field

The present disclosure relates to the field of vehicle operator distraction mitigation. In particular, to a system and method for distraction mitigation wherein a location of a mobile device within one of one or more zones may be determined and the behavior of a mobile device and/or in-vehicle systems with which the mobile device interacts may be modified based on the determined location.

2. Related Art

Recent studies and accident statistics suggest that the use of mobile devices such as, for example, smartphones by automobile drivers while driving may be a significant cause of driver distraction and may contribute to an elevated risk of accidents. In some jurisdictions regulations exist, or are being considered, that ban or restrict the use of mobile devices by drivers while operating a vehicle. The effectiveness of these regulations is dependent on voluntary compliance by drivers and detection of non-compliance by law enforcement agencies.

It may be desirable to provide a mechanism that restricts or disables operation of one or more functions of a mobile device and/or in-vehicle systems by a driver while operating a vehicle.

BRIEF DESCRIPTION OF DRAWINGS

The system and method may be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

Other systems, methods, features and advantages will be, or will become, apparent to one with skill in the art upon examination of the following figures and detailed description. It is intended that all such additional systems, methods, features and advantages be included with this description and be protected by the following claims.

DETAILED DESCRIPTION

A system and method for distraction mitigation wherein a location of a mobile device within one of one or more zones in a vehicle may be determined and the behavior of the mobile device and/or in-vehicle systems, with which the mobile device interacts, may be modified based on the determined location. In one example, the location of a smartphone may be determined to be within the area (a.k.a. zone) of an automobile cabin associated with a driver of the automobile and the smartphone user interface may be locked to prevent direct operation of the smartphone by the driver while still allowing indirect operation via, for example, a Bluetooth connection to an automobile infotainment system.

Figure 1:
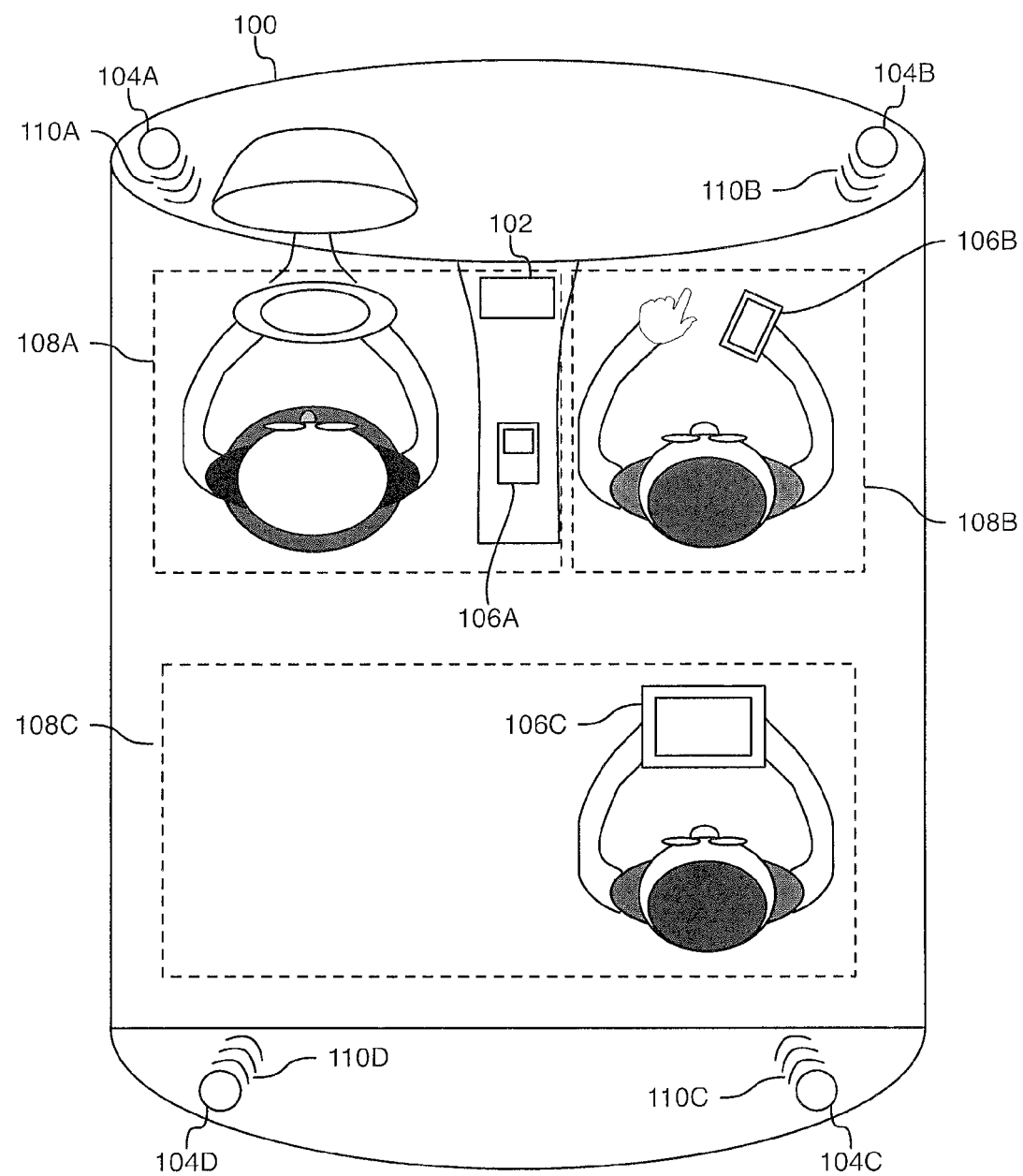
FIG. 1 is a schematic representation of an overhead view of an automobile cabin in which a system and method for distraction mitigation may be used.

FIG. 1 is a schematic representation of an overhead view of an automobile cabin in which a system and method for distraction mitigation may be used. The example automobile cabin 100 may include an infotainment system 102 (a.k.a. an in-vehicle system) and multiple audio transducers 104A, 104B, 104C and 104D (collectively or generically audio transducers 104). The infotainment system 102 may include support for one or more functions such as radio tuner, media player, hands-free telephony, navigation system and other similar infotainment functions. Some of the functions of the infotainment system 102, for example media player or hands-free telephony, may be provided through interaction with one or more mobile devices such as driver's mobile device 106A and passengers' mobile devices 106B and 106C (collectively or generically mobile devices 106).

One or more of the audio transducers 104 may emit encoded signals 110A, 110B, 110C and 110D (collectively or generically encoded signals 110) that may be received by each of the mobile devices 106. Each mobile device 106 may decode the received signals to extract location information and zone information. The location information may include any information that may be used by a mobile device 106 to determine its location relative to the locations of audio transducers 104. The zone information may include descriptive information that defines one or more zones in the vehicle cabin relative to the locations of audio transducers 104. For example, the zones may include a driver's zone 108A, a front passenger zone 108B and a rear seat passengers' zone 108C (collectively or generically the zones 108).

The encoded signals 110 emitted by the audio transducers 104 may be received by each mobile device 106 via an audio receiver and one or more microphones. Alternatively, or in addition, the encoded signals 110 may be emitted by radio frequency (RF) transmitters, ultrasonic transmitters, or other forms of emitters suitable to emitting encoded signals 110 and the mobile devices 106 may receive the encoded signals 110 using corresponding signal receivers suitable to receive the audio, RF, ultrasonic or other form of encoded signals 110.

The location information contained in each encoded signal 110 may include identification of the audio transducer 104 (or alternatively other form of emitter) and the audio transducer's 104 location. The audio transducer's location may, for example, be represented in X and Y coordinates in a Cartesian plane. The X and Y coordinates may be expressed in distance units (e.g. centimeters) or in grid units (e.g. 2 gridlines over by 3 gridlines down) relative to a point of reference (e.g. 0,0).

The zone information contained in each encoded signal 110 may include one or more of: a zone identifier, a zone boundary definition, a zone type, and zone restrictions. The zone identifier may be in the form of an enumerated identifier (e.g. 1, 2, 3, . . . or A, B, C, . . . ), in the form of a named identifier (e.g. driver, front passenger, rear passengers) or in other similar forms that allow the zones to be distinguished from each other. The zone boundary definition may be in the form of the dimensions and relative position of a geometric figure that delineates the boundary of the zone (e.g. a 60×90 cm rectangular area having a front left vertex at offset 0.25 cm from the point of reference). The zone type may be in the form of types, or classes, each having pre-defined privileges or restrictions (e.g. fully restricted operation, partially restricted operation or unrestricted operation) or in the form of roles (e.g. driver, passenger) having associated privileges or restrictions. The zone restrictions may be in the form of restrictions to specific operations such as, for example, no direct manual operation allowed, no voice control allowed, no texting or messaging allowed, no email allowed, no media source change allowed, no volume setting change allowed and other similar restrictions.

The location information and zone information (e.g. encoded signal 110) contained in the one or more emitted audio signals may be psychoacoustically hidden, or masked, such that a human may not perceive the added location information and zone information. Time and frequency based psychoacoustic masking models may be used to determine where additional audio signal content (e.g. encoded signal 110) may be added to the emitted audio signals in order for the additional audio signal to be imperceptible. The additional audio signal content (e.g. encoded signal 110) may include the location information and/or zone information. A frequency based psychoacoustic masking model may calculate a masked signal-to-noise ratio (SNR) across frequency bands based on one or more currently emitted audio signals. For example, two or more emitted audio signals with different signal content (e.g. stereo or other multi-channel audio) may be included in the masked SNR calculation. The human listener may not perceive additional audio content added at a signal level below the masked SNR. Alternatively, or in addition, the physchoacoustic masking model may include two or more emitted audio signals and an environmental noise signal in the calculated masked SNR. A microphone may be used to capture the environmental noise that may be included in the masked SNR calculation. In a further alternative, a vehicle may have an environmental noise level allowing location information and zone information to be reproduced and psychoacoustically masked by the environmental noise even in absence of an emitted audio signal. In this case the environmental noise signal is used to determine a output signal level for the additional audio signal (e.g. encoded signal 110).

The psychoacoustically masked additional audio content (e.g. encoded signal 110) may be added to the emitted audio signals as structured noise and/or tones. Modulating the phase and/or amplitude of a tone may be used to transmit a digital encoded signal. The structured noise may be a maximum length sequence, or MLS, that may be modified, or filtered, in the frequency domain to be below the masked SNR. An MLS sequence may be used to determine the latency between a transmitter and a receiver. The latency may be used to calculate the distance between an audio transducer 104 in the vehicle and the mobile device 106. Each of the two or more emitted signals may include a different MLS in order to distinguish each emitted signal from the others. The location of the mobile device 106 may be determined by analyzing the additional audio content (e.g. encoded signal 110) contained in each of the two or more emitted audio signals and/or the emitted signal level. The mobile device 106 may analyze the emitted signals to calculate the location. In one alternative, the mobile device 106 may transmit the captured signals to an in-vehicle system so that the in-vehicle system may analyze and calculate the mobile device location.

Each mobile device 106 may use the encoded signals 110 received from the audio transmitters 104 to determine its location relative to the locations of audio transducers 104 and/or a point of reference. Each mobile device 106 may use any know method of localization including, for example, triangulation, trilateration, ranging, multilateration to determines it's location. The determined location may be used by the mobile device 106 to further determine within which zone's boundaries the mobile device 106 is located.

When any of the mobile devices 106 has determined its location and/or which zone it is in (a.k.a. the occupied zone), it may use corresponding zone type and/or zone restrictions to modify the behavior of the mobile device 106 including, for example, disabling one or more applications, disabling one or more features within any of one or more applications, blocking one or more functions of the mobile device, locking the mobile device, disabling one or more modes of the mobile device user interface, and displaying a warning message.

The mobile device 106 may share its location and/or occupied zone with one or more in-vehicle systems such as, for example, the infotainment system. The mobile device 106 may connect to and share information with the one or more in-vehicle systems using a data communications mechanism such as, for example, Bluetooth® (Bluetooth SIG, Inc., Kirkland, Wash.), Wi-Fi™ (Wi-Fi Alliance, Austin, Tex.), Universal Serial Bus (USB), near field communications (NFC), proprietary protocols and other similar data communications mechanisms. The in-vehicle systems may use the location and/or occupied zone of each mobile device 106 to allow or restrict operations and/or interactions with the mobile device 106. The in-vehicle systems may alternatively, or in addition, use the location and/or occupied zone of each mobile device 106 to display the position of the mobile device 106 in a user interface to facilitate selection of the mobile device 106 by a user and/or to determine pairing order (e.g for a Bluetooth connection) or prioritization of multiple mobile devices 106 with the in-vehicle system.

The encoded signals 110 may be emitted using any one or more triggers such as, for example, vehicle door opening or closing, vehicle start-up, drivetrain engagement, vehicle motion start/stop, periodically or based on a request from any of the mobile devices 106. Each mobile device 106 may request an emission of the encoded signals 110 based on one or more triggers such as power-on of the mobile device 106, sensed motion of the mobile device 106 (e.g. using accelerometer) or other similar triggers. The mobile device 106 may request an emission of the encoded signals 110 when it detects motion in order to determine which zone it is in or whether the occupied zone has changed. Each mobile device 106 may disable or restrict certain operations or functions based on the zone it is located in (a.k.a. the occupied zone).

Providing the zone information from the vehicle to the mobile device 106 mitigates the need for the mobile device 106 to be pre-configured with, or to have access to, information identifying the vehicle make, model or configuration. For example, the mobile device does not need to know if the vehicle is configured for left-hand or right-hand side drive, self-driven or chauffer-driven (e.g. limousine, taxi, or similar), the number of rows of seats (e.g. optional third-row configuration). In addition, having the vehicle provide the zone information facilitates correct operation of the mobile device and in-vehicle system in use cases such as a driver switching between vehicles and driving a rental vehicle.

Figure 2:
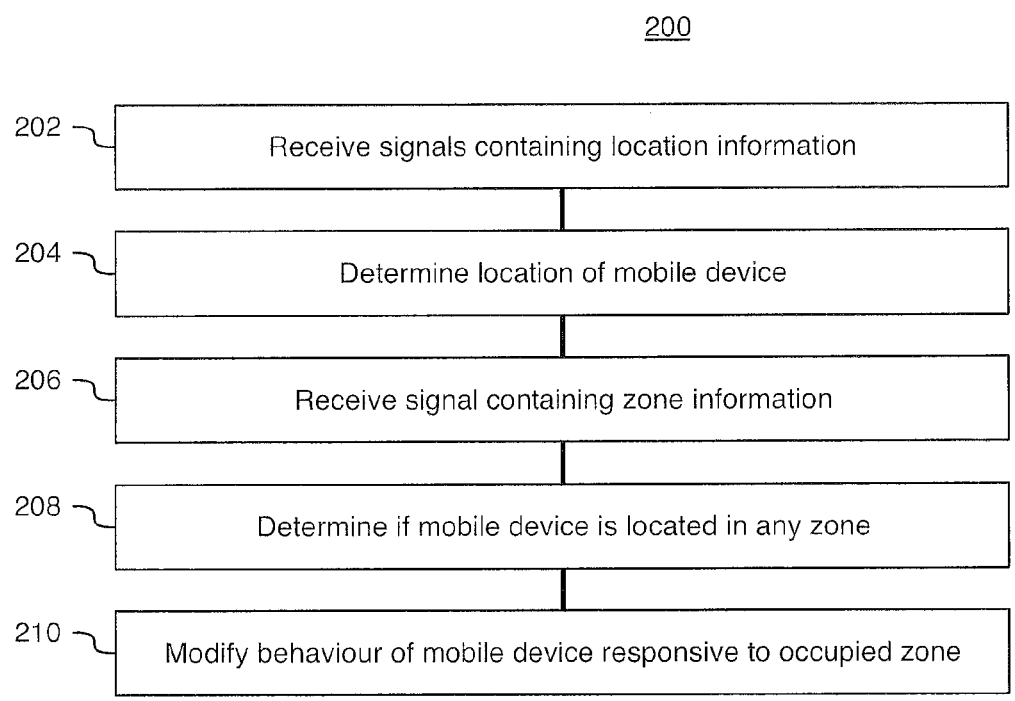
FIG. 2 is a representation of a method for distraction mitigation.

FIG. 2 is a representation of a method for distraction mitigation. The method 200 may be, for example, implemented using the systems 400 and 600 described herein with reference to FIGS. 4 and 6. The method 200 may include the following acts that are further described above. Receiving (202) one or more signals containing location information. Determining (204) a location of a mobile device within a vehicle. Receiving (206) a signal containing zone information. The zone information may define one or more zones in the vehicle. Determining (208) if the mobile device is located within any of the one or more zones. Modifying (210) the behavior of the mobile device responsive to an occupied zone. The occupied zone is a zone of the one or more zones defined by the zone information that the mobile device is determined to be in.

Figure 3:
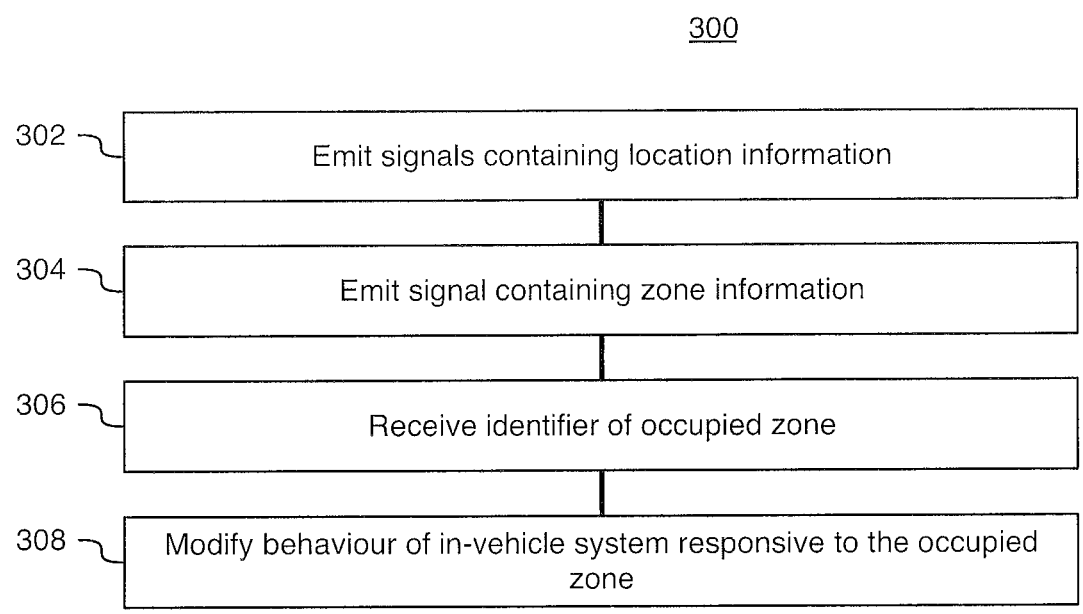
FIG. 3 is a further representation of a method for distraction mitigation.
Figure 4:
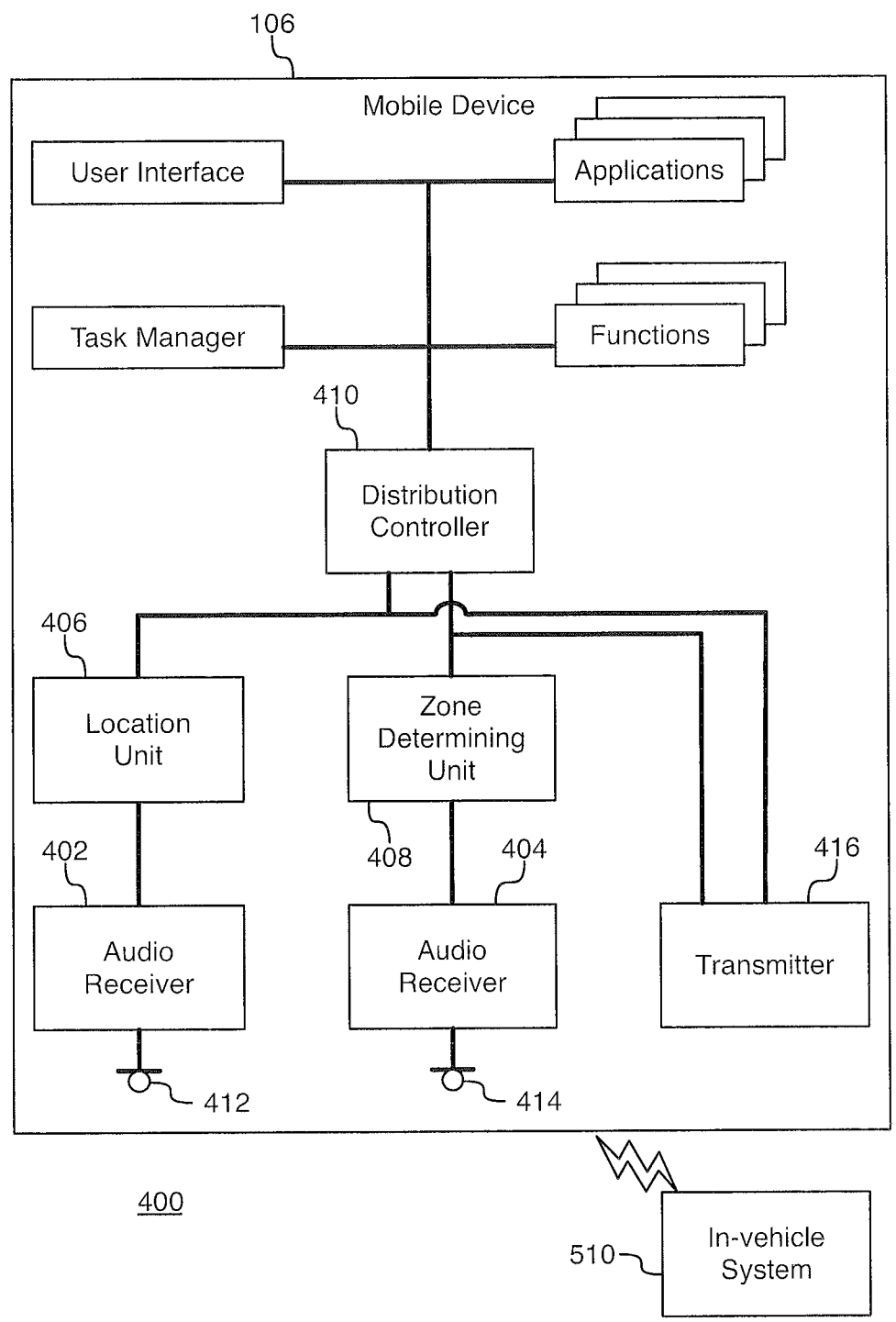
FIG. 4 is a schematic representation of a system for distraction mitigation.

FIG. 3 is a further representation of a method for distraction mitigation. The method 300 may be, for example, implemented using the systems 500 and 600 described herein with reference to FIGS. 5 and 6. The method 300 may include the following acts that are further described above. Emitting (302) one or more signals containing location information. Emitting (304) a signal containing zone information. The zone information may define one or more zones in a vehicle. The emitted signals may be received by a mobile device 106. Receiving (306) from the mobile device an identifier of an occupied zone. The occupied zone is a zone of the one or more zones defined by the zone information that the mobile device 106 is determined to be in. Modifying (308) the behavior of one or more in-vehicle systems responsive to the occupied zone. The behavior of the one or more in-vehicle systems may include the behavior with regard to interactions with the mobile device 106. In another example, modifying the behavior of the one or more in-vehicle systems responsive to the occupied zone may include configuring the in-vehicle systems (e.g. infotainment system) in accordance with user preferences associated with the mobile device 106 in the occupied zone. In a further example, modifying the behavior of the one or more in-vehicle systems may include any of disabling one or more applications, disabling one or more features within any of one or more applications, blocking one or more functions of the in-vehicle system, locking the in-vehicle system, disabling one or more modes of the in-vehicle system user interface, and displaying a warning message FIG. 4 is a schematic representation of a system for distraction mitigation. The example system 400 includes a first audio receiver 402, a second audio receiver 404, a location unit 406, a zone detection unit 408 and a distraction controller 410. The first audio receiver 402 may receive two or more audio signals containing location information via, for example, a microphone 412. The second audio receiver 404 may receive an audio signal containing zone information via, for example, a microphone 414. Alternatively, either or both of the first and second audio receivers 402 and 404 may be receivers for RF or ultrasonic signals. In a further alternative, the first and second audio receivers 402 and 404 may be a single common receiver and may receive signals via a single common microphone or multiple shared microphones. The location unit 406 may use the location information in the received signals to determine a location of a mobile device 106 in a vehicle. The system 400 may be incorporated into the mobile device 106. The zone determining unit 408 may use the zone information in the received signal together with the determined location of the mobile device 106 to determine which, if any, zone the mobile device 106 is located in. The zone information may define one or more zones in the vehicle. A zone, of the one or more zones, in which the mobile device 106 is located, may be referred to as the occupied zone. The distraction controller 410 may used the occupied zone to modify the behavior of mobile device 106. In addition, the system 400 may include a transmitter 416 that may transmit either or both the location of the mobile device 106 and an identifier of the occupied zone to an in-vehicle system 510.

Figure 5:
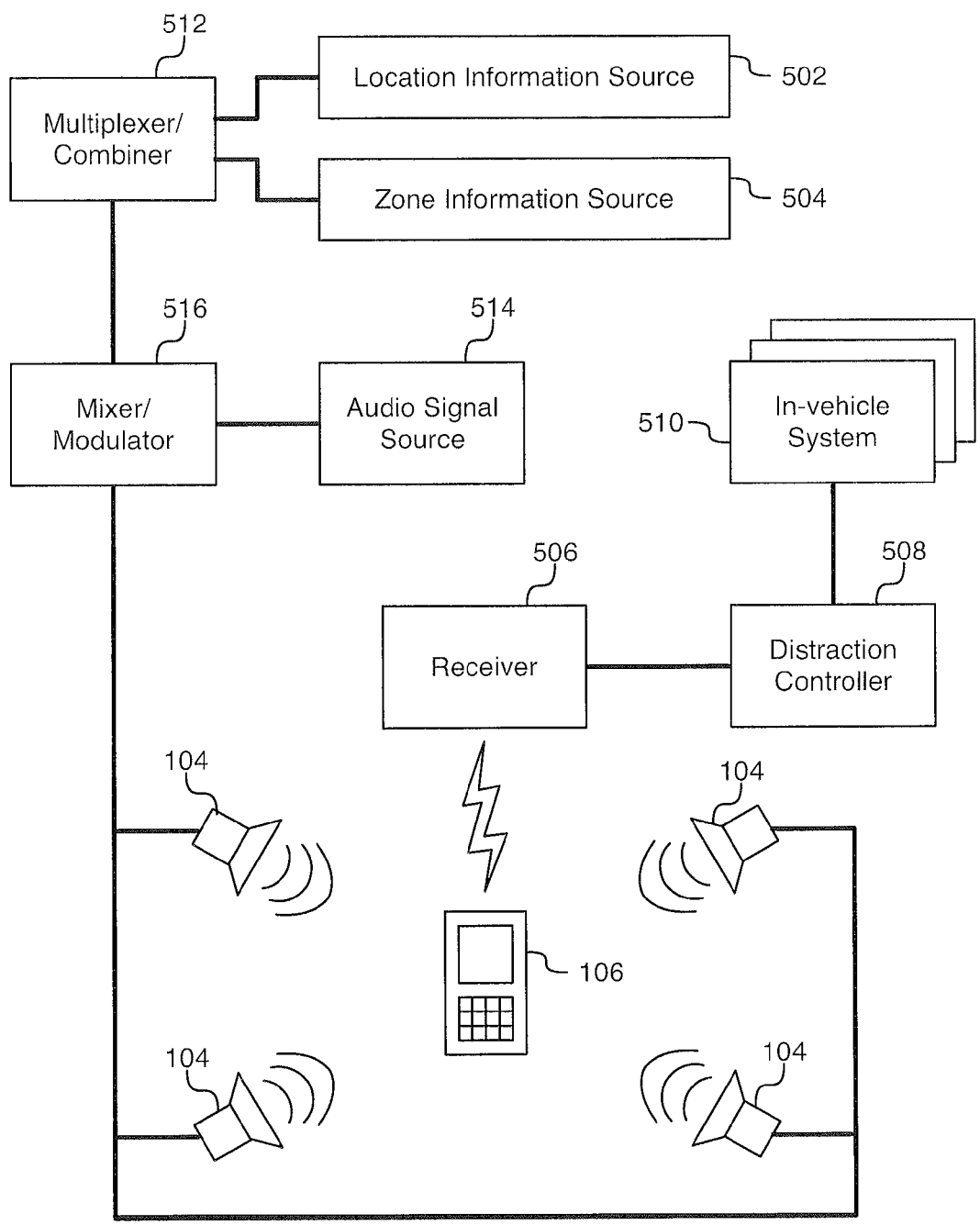
FIG. 5 is a further schematic representation of a system for distraction mitigation.

FIG. 5 is a further schematic representation of a system for distraction mitigation. The example system 500 includes a location information source 502, a zone information source 504, multiple audio transducers 104, a receiver 506, a distraction controller 508 and one or more in-vehicle systems 510 that are incorporated into a vehicle. The audio transducers 104 may each emit audio signals containing either or both location information from the location information source 502 and zone information from the zone information source 504. The location information and zone information may optionally be combined in a common signal using, for example, a multiplexer/combiner 512. Alternatively, or in addition, the location and/or zone information may be mixed into an audio signal from an audio signal source 514, such as infotainment system 102, using, for example, a mixer/modulator 516. The audio signal may be a multi-channel signal providing different content to each of the audio transducers 104. The signals emitted by the audio transducers 106 may be received by a mobile device 106 and used to determine a location and occupied zone in which the mobile device 106 is located. The receiver 506 may receive either or both a location and an occupied zone transmitted by the mobile device 106. The distraction controller 508 may use the received location and/or occupied zone to modify the behavior of the one or more in-vehicle systems 510. The behavior of the one or more in-vehicle systems 510 may be modified with regard to interactions with the mobile device 106 in order to, for example, mitigate driver distraction.

Figure 6:
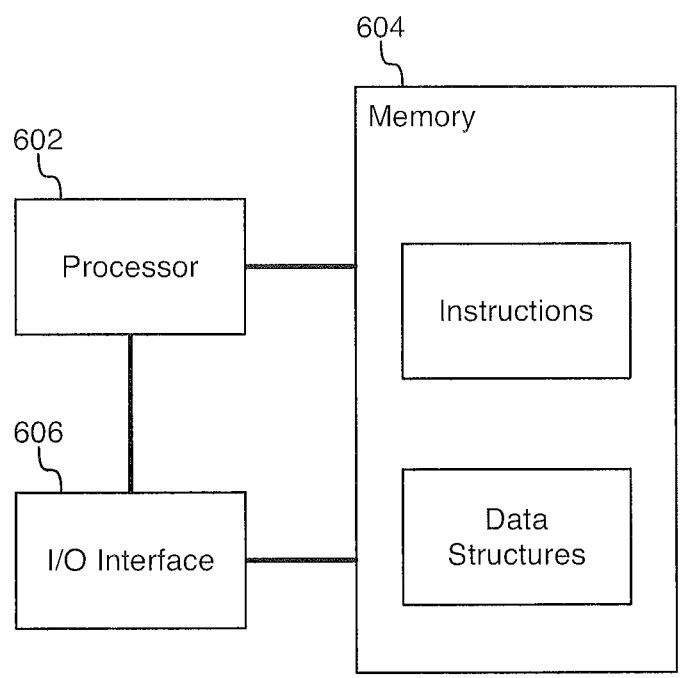
FIG. 6 is another schematic representation of a system for distraction mitigation.

FIG. 6 is a schematic representation of a system for distraction mitigation. The system 600 comprises a processor 602, memory 604 (the contents of which are accessible by the processor 602) and an I/O interface 606. The processor 602 may comprise a single processor or multiple processors that may be disposed on a single chip, on multiple devices or distributed over more that one system. The processor 602 may be hardware that executes computer executable instructions or computer code embodied in the memory 604 or in other memory to perform one or more features of the system. The processor 602 may include a general purpose processor, a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 604 may comprise a device for storing and retrieving data, processor executable instructions, or any combination thereof. The memory 604 may include non-volatile and/or volatile memory, such as a random access memory (RAM), a read-only memory (ROM), an erasable programmable read-only memory (EPROM), or a flash memory. The memory 604 may comprise a single device or multiple devices that may be disposed on one or more dedicated memory devices or on a processor or other similar device. Alternatively or in addition, the memory T04 may include an optical, magnetic (hard-drive) or any other form of data storage device.

The memory 604 may store computer code, such as instructions which when executed using the process 602 may cause the system 600 to render the functionality associated with either of methods 200 and 300 as described herein. The computer code may include instructions executable with the processor 602. The computer code may be written in any computer language, such as C, C++, assembly language, channel program code, and/or any combination of computer languages. The memory 604 may store information in data structures including, for example, location information, zone information and signal content.

The I/O interface 606 may be used to connect devices such as, for example, receivers 402 and 404, transmitter 416, emitters (e.g. audio transducers 104), receiver 506, in-vehicle systems 510 and to other components of the system 600.

All of the disclosure, regardless of the particular implementation described, is exemplary in nature, rather than limiting. The systems 400, 500 and 600 may include more, fewer, or different components than illustrated in FIGS. 4, 5 and 6. Furthermore, each one of the components of systems 400, 500 and 600 may include more, fewer, or different elements than is illustrated in FIGS. 4, 5 and 6. Flags, data, databases, tables, entities, and other data structures may be separately stored and managed, may be incorporated into a single memory or database, may be distributed, or may be logically and physically organized in many different ways. The components may operate independently or be part of a same program or hardware. The components may be resident on separate hardware, such as separate removable circuit boards, or share common hardware, such as a same memory and processor for implementing instructions from the memory. Programs may be parts of a single program, separate programs, or distributed across several memories and processors.

The functions, acts or tasks illustrated in the figures or described may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing, distributed processing, and/or any other type of processing. In one embodiment, the instructions are stored on a removable media device for reading by local or remote systems. In other embodiments, the logic or instructions are stored in a remote location for transfer through a computer network or over telephone lines. In yet other embodiments, the logic or instructions may be stored within a given computer such as, for example, a CPU.

While various embodiments of the system and method for distraction mitigation have been described, it will be apparent to those of ordinary skill in the art that many more embodiments and implementations are possible within the scope of the present invention. Accordingly, the invention is not to be restricted except in light of the attached claims and their equivalents.

The invention claimed is:

1. A method for distraction mitigation comprising:
receiving one or more signals containing location information associated with one or more emitters, wherein the one or more emitters are located within a vehicle;
determining under instructions from a microprocessor a location of a mobile device within the vehicle in response to receiving the one or more signals associated with the location information associated with the one or more emitters;
receiving a signal containing zone information defining one or more zones of a plurality of zones in the vehicle;
determining at the mobile device if the mobile device is located within the one or more zones of the plurality of zones in the vehicle in response to receiving the signal generated in the vehicle containing the zone information; and
modifying the behavior of the mobile device under instructions from the microprocessor in response to the one or more zones, that the mobile device is determined to be in;
where the location information and the zone information .s are added to an audio signal and the location information and the zone information are masked in response to a time and frequency based psychoacoustic model that is utilized to determine where within the audio signal the location information and the zone information are added to the audio signal.

2. The method for distraction mitigation of claim 1, where the location information and the zone information is contained in a common signal.

3. The method for distraction mitigation of claim 1, further comprising transmitting an identifier of the occupied zone and mobile device identification information to an in-vehicle system.

4. The method for distraction mitigation of claim 1, where the behavior of the mobile device is modified to mitigate distraction of an operator of the vehicle.

5. The method for distraction mitigation of claim 1, where modifying the operation of the mobile device includes any of: disabling one or more applications, disabling one or more features within any of one or more applications, blocking one or more functions of the mobile device, locking the mobile device, disabling one or more modes of the mobile device user interface, and displaying a warning message.

6. The method for distraction mitigation of claim 1, where the zone information includes one or more of: a zone identifier, a zone boundary definition, a zone type, and zone restrictions.

7. The method for distraction mitigation of claim 6, where the zone type includes any of: a class having pre-defined privileges or restrictions, and a role having associated privileges or restrictions.

8. A system for distraction mitigation comprising:
a first receiver to receive one or more signals, each respective one of the one or more signals containing emitter location information associated with a respective emitter of one or more emitters, wherein the one or more emitters are located within a vehicle and the emitter location information includes a location within the vehicle of the respective emitter that transmitted the signal;
a second receiver to receive a signal containing zone information defining one or more zones of a plurality of zones within the vehicle;
a location unit to determine a location of the mobile device within the vehicle responsive to the received location information;
a zone determining unit to determine if the mobile device is located within any of the one or more zones of the plurality of zones responsive to the received zone information and the determined location of the mobile device; and
a distraction controller to modify the behavior of the mobile device;
where each of the one or more signals containing the emitter location information including the location of a respective emitter, and the signal containing zone information, are made up of structured noise.

9. The system for distraction mitigation of claim 8, further comprising a transmitter to transmit an identifier of an occupied zone, that the mobile device is determined to be located in, to an in-vehicle system.

10. The system for distraction mitigation of claim 8, where the first and second receivers are adapted to receive any of: an audio signal, a radio frequency signal and an ultrasonic signal.

11. The system for distraction mitigation of claim 8, where the location unit determines the location of the mobile device using any of: triangulation, trilateration, ranging and multilateration.

12. The system for distraction mitigation of claim 8, where the behavior of the mobile device is modified to mitigate distraction of an operator of the vehicle.

13. The system for distraction mitigation of claim 8, where modifying the behavior of the mobile device includes any of: disabling one or more applications,
disabling one or more features within any of one or more applications, blocking one or more functions of the mobile device, locking the mobile device, disabling one or more modes of the mobile device user interface, and displaying a warning message.

14. A method for distraction mitigation comprising:
emitting one or more signals containing location information associated with one or more emitters receivable by a mobile device, wherein the one or more emitters are located within a vehicle;
emitting a signal containing zone information defining one or more zones in the vehicle receivable by the mobile device;
receiving from the mobile device an identifier that identifies a zone, of the one or more zones, that the mobile device is located within; and
modifying the behavior of one or more in-vehicle systems other than the mobile device in response to the zone that the mobile device is located within;
where the location and the zone information content is added to an audio signal and is masked in response to a time and frequency based psychoacoustic masking model that is utilized to determine where within the audio signal the location and the zone information is added to the audio signal.

15. The method for distraction mitigation of claim 14, where the location information and the zone information may be contained in a common signal.

16. The method for distraction mitigation of claim 14, where the identifier of the occupied zone is a location of the mobile device from which the occupied zone can be determined.

17. The method for distraction mitigation of claim 14, where the behavior of the in-vehicle system is modified to mitigate distraction of an operator of the vehicle.

18. The method for distraction mitigation of claim 14, where modifying the behavior of the in-vehicle system includes any of: disabling one or more applications, disabling one or more features within any of one or more applications, blocking one or more functions of the in-vehicle system, locking the in-vehicle system, disabling one or more modes of the in-vehicle system user interface, displaying a warning message, modifying interactions with the mobile device and configuring the in-vehicle system in accordance with user preferences associated with the mobile device.

19. The method for distraction mitigation of claim 14, where the zone information includes one or more of: a zone identifier, a zone boundary definition, a zone type, and zone restrictions.

20. The method for distraction mitigation of claim 19, where the zone type includes any of: a class having predefined privileges or restrictions, and a role having associated privileges or restrictions.

21. A system for distraction mitigation comprising:
a location information source to provide location information from which a location in a vehicle can be determined;
a zone information source to provide zone information defining one or more zones in the vehicle;
a plurality of first emitters located within the vehicle to emit one or more signals in response to a time and frequency based masking model that is utilized to determine the position of the location information within the emitted signal;
a second emitter located within the vehicle to emit a second signal in response to the time and frequency based masking model that is utilized to determine the position of the zone information within the second emitted signal;
a receiver to receive an identifier of an occupied zone, of the one or more zones, for a mobile device within the vehicle determined from the emitted location information and emitted zone information at the mobile device; and
a distraction controller to modify the behavior of one or more in-vehicle systems wirelessly linked to the mobile device and responsive to the occupied zone.

22. The system for distraction mitigation of claim 21, where the second emitter comprises one or more of the plurality of first emitters.

23. The system for distraction mitigation of claim 21, where the behavior of the one or more in-vehicle systems is modified to mitigate distraction of an operator of the vehicle.

24. The system for distraction mitigation of claim 21, where modifying the behavior of the one or more in-vehicle systems includes any of: disabling one or more applications, disabling one or more features within any of one or more applications, blocking one or more functions of the in-vehicle system, locking the in-vehicle system, disabling one or more modes of the in-vehicle system user interface, displaying a warning message, modifying interactions with the mobile device and configuring the in-vehicle system in accordance with user preferences associated with the mobile device.

* * * * *